(12) United States Patent
Konrad et al.

(10) Patent No.: US 6,363,731 B1
(45) Date of Patent: Apr. 2, 2002

(54) SYSTEM FOR EXTRACTING A LIQUID FROM A GAS STREAM

(75) Inventors: Gerhard Konrad; Thomas Poschmann, both of Ulm; Steffen Wieland, Wetzlar, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/659,036

(22) Filed: Sep. 11, 2000

(30) Foreign Application Priority Data

Sep. 9, 1999 (DE) .......................... 199 43 059

(51) Int. Cl.⁷ .............................. F25B 9/00; F25D 9/00
(52) U.S. Cl. .......................................... 62/87; 62/402
(58) Field of Search ....................... 62/401, 402, 87, 62/91

(56) References Cited

U.S. PATENT DOCUMENTS

| | | | | |
|---|---|---|---|---|
| 3,982,962 A | | 9/1976 | Bloomfield | 429/19 |
| 4,018,060 A | * | 4/1977 | Kinsell et al. | 62/91 |
| 4,021,215 A | * | 5/1977 | Rosenbush et al. | 62/402 |
| 4,738,903 A | * | 4/1988 | Garow et al. | 429/17 |
| 4,743,517 A | * | 5/1988 | Cohen et al. | 429/17 |
| 5,121,610 A | * | 6/1992 | Atkinson et al. | 62/151 |
| 5,373,707 A | * | 12/1994 | Ostersetzer et al. | 62/401 |
| 5,628,203 A | * | 5/1997 | Adolph et al. | 62/402 |
| 6,041,615 A | * | 3/2000 | Ostersetzer et al. | 62/402 |

FOREIGN PATENT DOCUMENTS

EP 629 103 5/1994

* cited by examiner

Primary Examiner—William C. Doerrler
(74) Attorney, Agent, or Firm—Crowell & Moring LLP

(57) ABSTRACT

A method for the extraction of a liquid by condensation from a gas stream, wherein the gas stream contains the liquid mainly as fluid steam, includes expanding the gas stream in an expansion device and condensing at least a portion of the liquid downstream from the expansion device. The gas stream is then recompressed by at least one compressing device.

17 Claims, 1 Drawing Sheet

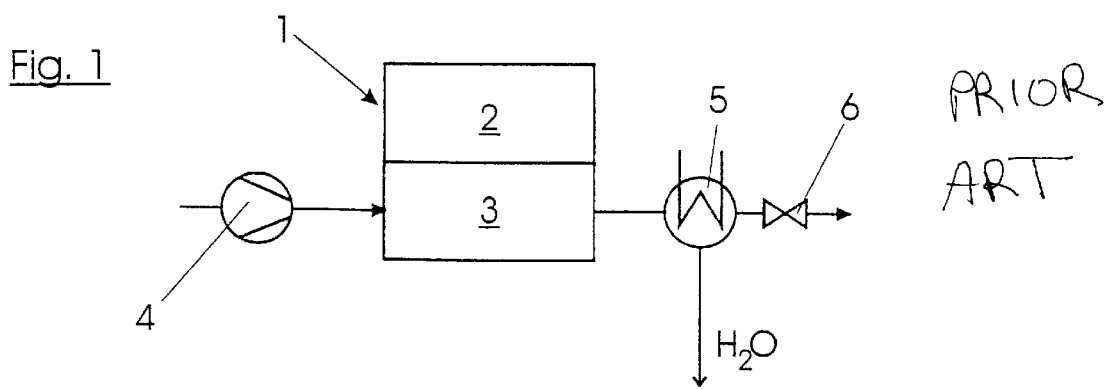
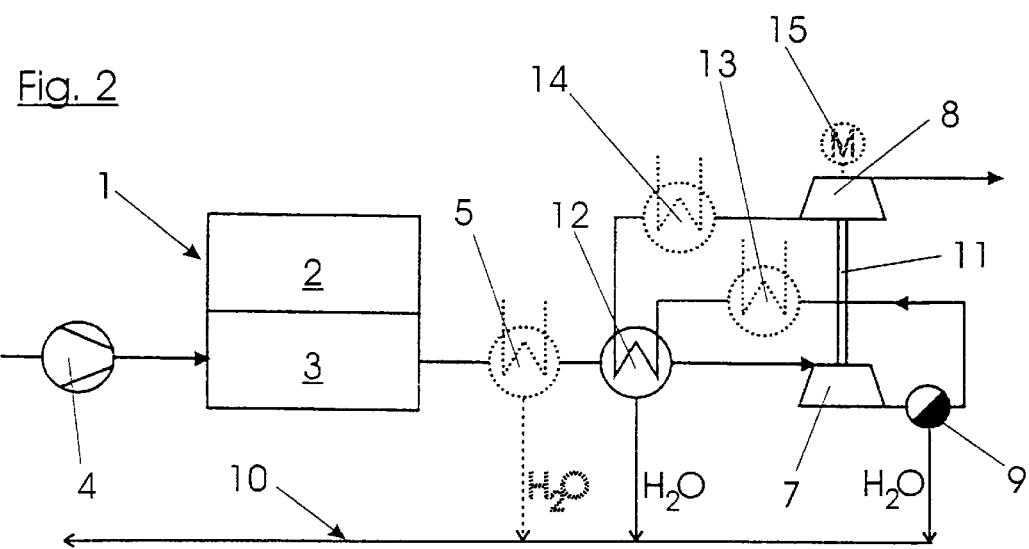
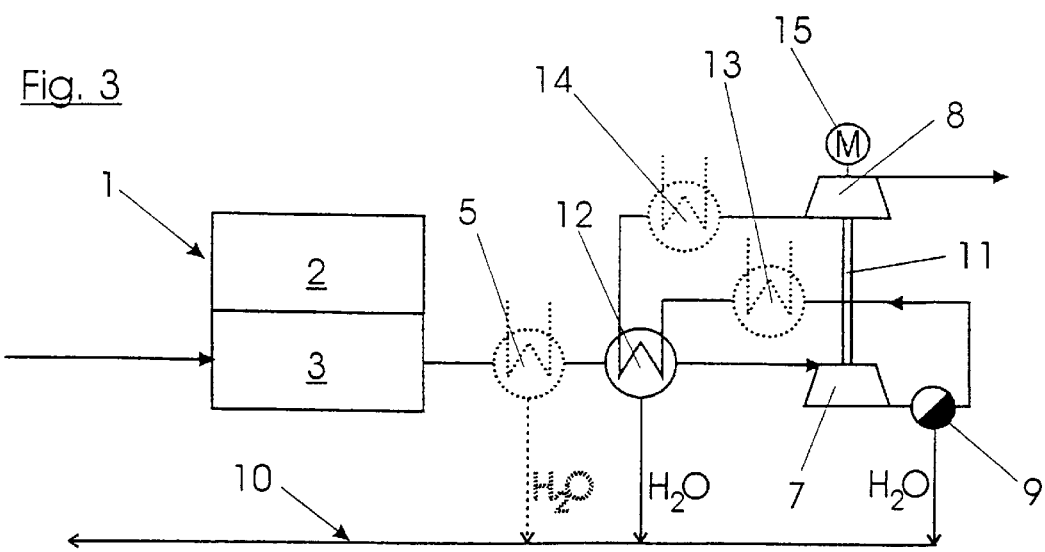

SYSTEM FOR EXTRACTING A LIQUID FROM A GAS STREAM

BACKGROUND AND SUMMARY OF INVENTION

This application claims the priority of German patent document 199 43 059.4, filed Sep. 9, 1999, the disclosure of which is expressly incorporated by reference herein.

The present invention relates to a system for condensing a liquid out of a gas stream.

In particular, the present invention relates to the condensation of water out of the exhaust gases flowing from a fuel cell system, and especially from the exhaust gas flowing from a fuel cell stack and a reformer as part of a gas generating system of the fuel cell system.

In the use of fuel cell systems, especially those with reforming reactors or reformers for the production of hydrogen, it is important, in order to assure the moistening of input air and fuel gas or hydrogen, to be able to make sufficient water available. Another point which makes the moistening of the fuel gas and input air necessary is that sufficiently moistened gases must be made available in order to prevent the solid electrolyte from drying out.

To avoid the need for additional water (that is, to assure a controlled water circulation without the need to refill the water tanks), the water contained in the exhaust gas streams from the fuel cell or fuel cell stack and from the reformer can be recovered. Especially interesting here is the cathode air from the fuel cell stack, which in addition to the water loaded in for moistening, also contains the product water from the electrochemical reaction of the fuel cell stack.

It is generally known in the state of the art to employ an extraction of water by condensation. Especially in motor vehicle applications, the cathode air containing liquid vapor is cooled by a generally known and conventional vehicle radiator. Thus, a partial condensation of the liquid content of the gas stream of the cathode air is accomplished.

However, it has proven to be a disadvantage that the temperature level to be reached in an ordinary vehicle radiator, which can amount to 55° C. and higher, depending on the environment, is not sufficient to assure an even water balance in a corresponding fuel cell system.

It is known from the field of power plant applications of fuel cells, especially in medium-temperature and high-temperature fuel cells, to utilize the energy contained in the exhaust gases, especially in the cathode air of the fuel cell, by expansion systems, such as turbines or turbine-generator units. The energy is converted mainly into electrical energy and thus increases the efficiency of the overall system.

Alternatively, the energy produced by the turbine can also be used to operate a compressor system which produces the pressure of the input air or fuel gases necessary for the operation of the fuel cell. EP 0 629 013 B and U.S. Pat. No. 3,982,962, which describe such applications, may be consulted, for example.

It is therefore an object of the present invention to create a system which is capable of condensing a large part of a liquid contained in a gas stream and making the liquid thus recovered available again for the system.

This object is achieved by the system according to the present invention.

According to the present invention, the combination of an expansion apparatus and a compressor unit achieves both (1) the condensation of comparatively great amounts of liquid out of a gas stream and (2) the cooling of a gas stream below a temperature level established by environmental conditions. In the expansion apparatus, the gas stream may be cooled substantially by, for example, polytropic expansion. In this way a further condensation from the gas stream originally saturated with fluid steam is accomplished. The energy content of the gas stream converted to mechanical energy in the expansion apparatus, which was previously in the form of temperature and pressure, is then utilized in the compressor unit to recompress the gas stream and exhaust it to the environment.

By the expansion and by the reduction of the temperature of the liquid-bearing gas stream which it entails, an amount of liquid far greater than in the state of the art is condensed out of the gas stream. The liquid is fed to a liquid circulation system so that, for example, in its application in a fuel cell system it is possible to eliminate any refilling of water tanks for the moistening of the input air or fuel gas streams for the fuel cell stack and the reformer.

In an embodiment of the present invention, the expansion apparatus and the compressor unit have a common drive shaft, so that the mechanical energy produced in the expansion apparatus can be made available directly to the compressor unit.

An especially advantageous application of the present invention is its use in a drive system for a motor vehicle with a gas generating system and a low-temperature fuel cell. The steam from the reformer exhaust, the exhaust from the cathode, and in some cases also the anode air of a fuel cell, are condensed and the water thus recovered is made available to a water circulation system. The water needed by the plant, (e.g., for moistening the input air and the fuel gas streams as well as the water for the reforming reaction) can be taken from the water circulation system.

Other objects, advantages and novel features of the present invention will become apparent from the following detailed description of the invention when considered in conjunction with the accompanying drawings.

BRIEF DESCRIPTION OF THE DRAWINGS

FIG. 1 shows a part of a fuel cell system with the condensation of water from the cathode air in the state of the art;

FIG. 2 shows an embodiment of the present invention for the condensation of water from the cathode air of a fuel cell when the fuel cell is operated with input pressure; and FIG. 3 shows an embodiment of the system of the present invention for condensing water out of the cathode air of a fuel cell when the fuel cell is operated without input pressure.

DETAILED DESCRIPTION OF THE DRAWINGS

FIG. 1 shows a fuel cell stack 1 or a fuel cell 1 having an anode chamber 2 and a cathode chamber 3. In the schematic representation of the state of the art, it can be seen that the air put into the cathode chamber 3 is compressed by a compression device 4, especially a compressor 4, to an input pressure. After leaving the cathode chamber 3 the moist cathode exhaust, carrying with it both the liquid from the moistening that takes place upstream from the apparatus shown, as well as the product water from the electrochemical reaction in the fuel cell 1, enters a radiator or condenser 5. If the fuel cell system is used for operating a motor vehicle, this can be the commonly used radiator 5.

In the condenser 5, through which incoming air flows and which cools the liquid flowing through it, a portion of the water ($H_2O$) contained in the cathode exhaust is condensed out. To prevent an excessively fast flow through the condenser 5 and to sustain the necessary pressure in the system following the compressor 4, the cathode air flows after the condenser through a controlled throttle valve 6.

With this construction according to the state of the art, which is represented in FIG. 1, a portion of the water can be condensed out of the cathode exhaust, but this amount of water is not sufficient to cover the water requirement of the fuel cell system for the moistening and the reforming reaction without a refilling of water.

FIG. 2 shows a portion of the fuel cell system having fuel cell 1 with the anode chamber 2 and the cathode chamber 3. The input air of the fuel cell 1 is compressed to an input pressure by the compressor 4 before it enters the cathode chamber 3. The cathode exhaust from the cathode chamber 3 then, however, enters a system for the condensation of the water it contains (i.e., the product water from the electrochemical reaction of the fuel cell 1 and the water from the moistening (not shown) of the input air ahead of the compressor 4).

The core of the system for the condensation of the water lies in an expansion apparatus 7 and a compressor unit 8. The gas stream, here the cathode exhaust, is expanded polytropically in the turbine unit 7.

The gas stream is expanded to a pressure below the ambient pressure around the apparatus, so that here there is a pressure level of usually less than 1 bar. By this expansion of the gas stream containing water or steam, it is greatly cooled, so that the condensation of at least a portion of the water or steam contained in the gas stream occurs.

After this polytropic expansion, also an isentropic expansion in the theoretical limit case, the expanded cathode exhaust is passed through a condensate separator 9 in which a separation of the water condensed out of the cathode exhaust after the turbine unit 7 takes place. On account of the reduction of the temperature of the moist cathode exhaust that is produced by the expansion in the turbine unit 7, relatively large amounts of water ($H_2O$) can here be condensed. The water that condenses out is collected and fed to a water circulating system 10 of the entire apparatus. The pressure level of the collected water must of course be raised back to the ambient pressure or the input pressure created by the compression apparatus 4. This can be achieved by a small pumping system (not shown) between the condensate separator and the water circulating system 10.

The water that is collected in the water circulating system 10 (i.e., the recovered moistening water and the product water from the electrochemical reaction in the fuel cell 1) can then be fed to a tank (not shown) out of which the water can be delivered back to moisten the gas stream ahead of fuel cell 1 and/or to a gas generating system (not shown), especially a reformer.

After the water is condensed out of the gas stream containing water or water vapor, the gas stream reaches the compressor unit 8 where it is compressed back to the ambient pressure. The exhaust gas or air leaving the compressor unit 8 and thus leaving the apparatus is then a warm, dry exhaust gas.

To make the mechanical energy produced in the turbine unit 7 directly available to the compressor unit 8, the two units 7 and 8 are arranged on a common drive shaft 11.

As it can be seen in FIG. 2, after the gas stream leaves condensate separator 9, greatly cooled by expansion in the turbine unit 7, it flows through a thermal transfer device 12. This non-essential, yet practical thermal transfer device 12 brings it about that the cathode exhaust flowing directly from the cathode chamber 3 to the turbine unit 7 comes into a heat-transferring contact in the thermal transfer device 12 with the gas stream which is much cooler after its expansion in the turbine unit 7.

The technical design of this thermal transfer device 12 can be a simple cross-current heat exchanger; a counter-current heat exchanger; or a similar known kind of thermal transfer device 12 in which the two media remain separated from one another but are in heat-transferring contact with one another. The cathode exhaust flowing from the cathode chamber 3 is cooled by the thermal transfer device 12 before reaching the turbine unit 7, so that a removal of water by condensation occurs already at this point. It is even to be expected that, at the thermal transfer device 12 a great percentage of water will condense out. This water is likewise collected and fed to the water circulating system 10.

In addition to a direct condensation of water, the thermal transfer device 12 produces a cooling of the gas stream, so that, after expansion in the expansion system 7, it will have a low temperature level, which improves the condensation in the condensate separator 9.

In another embodiment of the present invention, which is represented in the figures by dotted lines, a condenser 5 (such as a conventional automobile radiator 5), can also be arranged in the gas flow between the cathode chamber 3 and the thermal transfer device 12. In this condenser 5, the condensation of a small amount of water occurs, and can also be fed to the water circulating system 10. In addition to a conventional automobile radiator 5 through which a cooling air flows, or an indirect transfer of cooling caused by inflowing cooling air to a thermal transport medium and cooling of the gas stream by the thermal transport medium, other embodiments of the cooling system are conceivable. The cooling system could thus be a simple construction from a tube carrying the gas stream and through which air or coolant flows, but also structures in the nature of recuperative heat exchangers or the like can be used.

In addition to the direct extraction of water by condensation, condenser 5 also produces a cooling of the gas stream so that, after expansion in the expansion device 7, it will have a still lower temperature level, which again improves the extraction in the condensate separator 9 and in the area of the thermal transfer device 12.

Furthermore, the temperature level of the gas stream, greatly reduced by the expansion in the turbine unit 7 can be utilized by additional, optional heat exchangers 13 and 14. By the gas stream with the low temperature which is flowing through the heat exchangers 13 and 14, a thermal transfer medium such as cooling water or air, for example, can be brought down to a low temperature level. This cooling water or air can then be made available for additional applications within the fuel cell system or within a gas generating system. Thus it is possible in a motor vehicle, for example, to make available a temperature level below the temperature of the motor vehicle's radiator 5.

The heat exchangers 13 and 14 can be arranged in the system for extraction by condensation such that they deliver different temperature levels for external applications. In the embodiment shown, the temperature of the heat exchanger 13, which is arranged upstream from the heat transfer device 12, will be lower than in the case of the heat exchanger 14, which is arranged downstream from the heat transfer device 12. This is due to the fact that, after the expansion of the gas stream, and after the gas stream flows through each of the heat exchangers 13 and 14 and the heat transfer device 12, it is heated and thus has a higher temperature level in the downstream heat exchanger 14 than in heat exchanger 13.

The heat transfer device 12 and the heat exchangers 13 and 14 thus raise the temperature level of the gas stream before it reaches the compressor unit 8. Thus, at the output of the compressor unit 8 a comparatively warm yet dry exhaust gas or cathode exhaust is discharged to the environment.

If the mechanical energy released in the turbine unit 7 should not suffice to operate the compressor unit 8 as desired, especially on account of the optional heat exchangers 13 and 14 for the cooling of external systems, and due to losses that occur, then there is the option to compensate for the lost energy by means of an external motor 15, an electric motor 15, for example.

Without the use of the optional heat exchangers 13 and 14, and in some cases the thermal transfer device 12, the mechanical energy delivered by the turbine unit 7 is sufficient to operate the compressor unit 8 in the desired manner, since the losses occurring are made up for by the input of energy by the compressor 4.

In an embodiment of the present invention which is not shown, it is also possible to combine compressor 4, compressor unit 8, turbine unit 7 and the electric motor 15 on a common drive shaft 11 to form a compact unit with only one drive provided by the electric motor.

FIG. 3 shows an alternative embodiment which represents the same structure and the same manner of operation as FIG. 2. Only here the fuel cell 1 is operated without input pressure, which makes the use of the compressor 4 unnecessary. From the cathode chamber 3 the cathode exhaust follows the course described in FIG. 2, but here the external motor 15 or electric motor 15 is not an option.

Inasmuch as the cathode air ahead of the fuel cell 1 is blown into the fuel cell only by a blower (not shown) or the like, virtually without any preliminary pressure above the ambient pressure, the cathode exhaust, which is at the at least approximately ambient pressure, is expanded in the turbine unit 7 to a pressure level decidedly lower than the ambient pressure. After the cathode exhaust thus expanded has passed through the condensate separator 9, the thermal transfer device 12, and the two optional heat exchangers 13 and 14, it must be compressed by the compressor unit 8 back to the ambient pressure in order to be discharged to the environment as a warmed and dried exhaust gas. The energy necessary for this is supplied by the electric motor 15 and the turbine unit 7.

Depending on whether the fuel cell 1 is operated with or without preliminary pressure, the energy losses of the system for extraction by condensation must be provided either by the compressor 4 or by the electric motor 15.

The gas stream might also be virtually "sucked" through the apparatus by the turbine unit 7, so that aside from the turbine unit 7 and compressor unit 8, no other "drive" is needed for the gas flow. A comparable unit without compressor 4 and possibly also without the blower, especially a unit similar to the one with only one drive, described under FIG. 2, would be conceivable.

The optional heat exchangers 13 and 14, the optional compressor 4, as well as the water circulation system 10, and the extraction by condensation in at least one stage, i.e., after the turbine unit 7, are comparable with the system described under FIG. 2. Also the use of the thermal transfer device 12 as an additional stage of the extraction is of course practical, similarly to FIG. 2, but is not essential.

The preferred use of the described systems for the extraction of a liquid by condensation from a gas stream is certainly to be seen in the field of hybrid drives based on a fuel cell with a gas generating system. Attention is to be paid to their use in mobile applications, as for example in motor vehicles, in which methanol reformation is used in combination with a low-temperature fuel cell, such as a polymer membrane fuel cell.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for removing water out of an exhaust gas stream in a fuel cell system, comprising:
    expanding an exhaust gas stream from a fuel cell system in at least one expansion device;
    condensing at least a portion of the water from the expanded exhaust gas stream;
    compressing the expanded exhaust gas stream by at least one compressor unit;
    collecting the water in a liquid circulating system; and
    recirculating the water to the fuel cell system.

2. A method according to claim 1, wherein said expanding of the exhaust gas stream is to a pressure below ambient pressure, and said compressing of the exhaust gas stream is to ambient pressure.

3. A method according to claim 1, wherein the at least one expansion device and the at least one compressor unit have a common drive shaft.

4. A method according to claim 1, further comprising bringing an exhaust gas stream upstream from the at least one expansion device into heat-transferring contact with an exhaust gas stream downstream from the expansion device, thereby condensing water from the gas stream in an area of the heat-transferring contact.

5. A method according to claim 1, wherein the exhaust gas stream is compressed to a preliminary pressure by at least one compression device upstream from at least one system bringing in the liquid.

6. A method according to claim 1, wherein the exhaust gas stream is expanded polytropically in the at least one expansion device.

7. A method according to claim 3, wherein the common drive shaft is driven by a motor.

8. A method according to claim 7, wherein the motor is an electric motor.

9. A method according to claim 1, further comprising cooling the exhaust gas stream by an external cooling device upstream from the at least one expansion device, thereby condensing water in an area of the cooling device and feeding the condensed water to the liquid circulating system.

10. A method according to claim 1, further comprising flowing the exhaust gas stream downstream from the at least one expansion device through at least one heat exchanger.

11. A method according to claim 5, further comprising driving the compression device preceding the at least one device bringing in the liquid by the common drive shaft.

12. A method according to claim 1, wherein the at least one expansion device is a turbine.

13. A method according to claim 5, wherein the at least one device bringing in the liquid is a fuel cell system.

14. A method according to claim 13, wherein the at least one device bringing in the liquid comprises at least one of a reformer or a low-temperature fuel cell of a fuel cell system with gas generating system.

15. A fuel cell system for condensing a liquid out of a gas stream, comprising:
   a fuel cell;
   at least one expansion device;
   at least one condenser;
   at least one compressor unit connected to the at least one expansion device by a drive shaft;
   a water recirculating system, wherein water is recirculated from the at least one condenser to the fuel cell.

16. A fuel cell system according to claim 15, further comprising a heat exchanger upstream from the at least one expansion device.

17. A method according to claim 1, further comprising moistening at least one of fuel gases or input air with returned condensed water.

* * * * *